United States Patent
Lin et al.

(10) Patent No.: US 12,047,998 B2
(45) Date of Patent: Jul. 23, 2024

(54) TWO-PROTOCOL TRANSMISSION METHOD, RECEPTION METHOD AND CORRESPONDING DEVICES AND SIGNAL

(71) Applicant: ORANGE, Issy les Moulineaux (FR)

(72) Inventors: Hao Lin, Chatillon (FR); Getachew Redieteab, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 405 days.

(21) Appl. No.: 17/428,428

(22) PCT Filed: Feb. 3, 2020

(86) PCT No.: PCT/FR2020/050169
§ 371 (c)(1),
(2) Date: Aug. 4, 2021

(87) PCT Pub. No.: WO2020/161419
PCT Pub. Date: Aug. 13, 2020

(65) Prior Publication Data
US 2022/0132561 A1    Apr. 28, 2022

(30) Foreign Application Priority Data

Feb. 5, 2019   (FR) ..................................... 1901103

(51) Int. Cl.
*H04W 74/00*    (2009.01)
*H04L 5/00*     (2006.01)
(Continued)

(52) U.S. Cl.
CPC ......... *H04W 74/004* (2013.01); *H04L 5/0053* (2013.01); *H04W 16/14* (2013.01);
(Continued)

(58) Field of Classification Search
CPC . H04W 74/00; H04W 74/002; H04W 74/004; H04W 88/02; H04W 88/06;
(Continued)

(56) References Cited

U.S. PATENT DOCUMENTS 7,899,005 B2 *   3/2011   Retana .................... H04L 45/04
                                                        370/328
8,107,493 B2 *   1/2012   Kwon ...................... H04L 9/40
                                                        370/348

(Continued)

FOREIGN PATENT DOCUMENTS

WO    WO-2019135551 A1 *   7/2019   ............. H04L 67/02

OTHER PUBLICATIONS

English translation of the Written Opinion of the International Searching Authority dated May 28, 2020 for corresponding International Application No. PCT/FR2020/050169, filed Feb. 3, 2020.

(Continued)

*Primary Examiner* — Warner Wong
(74) *Attorney, Agent, or Firm* — David D. Brush; Westman, Champlin & Koehler, P.A.

(57) ABSTRACT

Use of a preamble conforming to a second protocol to which a preamble field conforming to a first protocol, different from the second one, is added, such as a protocol for accessing a mobile network deployed in an unlicensed band common to the second protocol, for any frame transmitted with a data field conforming to this first protocol.

10 Claims, 4 Drawing Sheets

Figure 6:
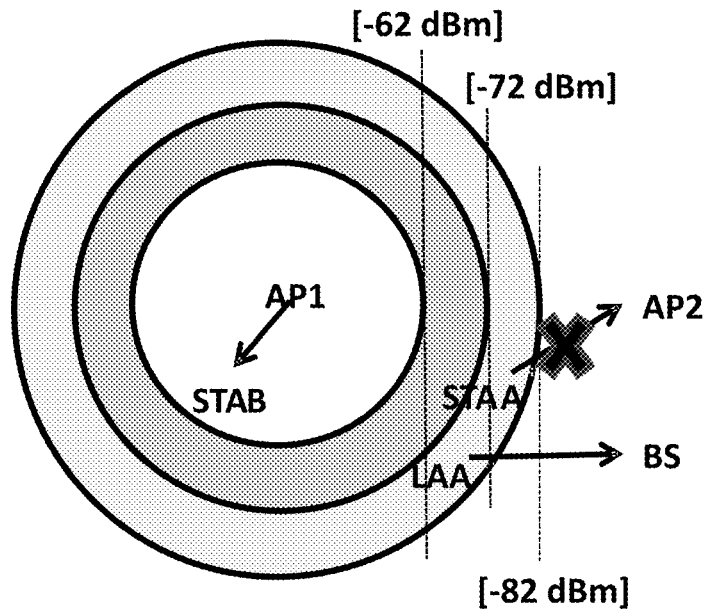

(51) Int. Cl.
*H04W 16/14* (2009.01)
*H04W 56/00* (2009.01)
*H04W 76/16* (2018.01)
*H04L 12/46* (2006.01)
*H04L 27/26* (2006.01)
*H04L 69/00* (2022.01)
*H04L 69/10* (2022.01)
*H04W 88/06* (2009.01)

(52) U.S. Cl.
CPC ......... *H04W 56/001* (2013.01); *H04W 76/16* (2018.02); *H04L 12/4633* (2013.01); *H04L 27/2692* (2013.01); *H04L 69/10* (2013.01); *H04L 69/26* (2013.01); *H04W 88/06* (2013.01)

(58) Field of Classification Search
CPC ..... H04W 76/00; H04W 76/15; H04W 76/16; H04W 56/00; H04W 56/001; H04W 16/00; H04W 16/14; H04W 80/00; H04L 5/003; H04L 5/0053; H04L 1/1812; H04L 69/00; H04L 69/08; H04L 69/10; H04L 69/26; H04L 61/00; H04L 61/2592; H04L 12/4633; H04L 67/00; H04L 67/01; H04L 27/2692
See application file for complete search history.

(56) References Cited

U.S. PATENT DOCUMENTS

| | | | | |
|---|---|---|---|---|
| 2006/0062196 A1* | 3/2006 | Cai | ................... | H04L 27/26132 370/345 |
| 2009/0067377 A1* | 3/2009 | Talukdar | ............... | H04L 5/0048 370/329 |
| 2009/0274173 A1* | 11/2009 | Wentink | .................. | H04L 69/22 370/474 |
| 2010/0046405 A1* | 2/2010 | Torsner | ................. | H04L 69/324 370/310 |
| 2010/0250770 A1* | 9/2010 | Barreto | ................. | H04L 65/756 709/231 |
| 2011/0261812 A1* | 10/2011 | Kini | ........................ | H04L 45/50 370/389 |
| 2016/0156752 A1* | 6/2016 | Li | ......................... | H04L 69/324 370/474 |
| 2017/0223571 A1* | 8/2017 | Ghosh | ..................... | H04L 5/001 |
| 2017/0280354 A1* | 9/2017 | Huang | .................. | H04L 69/161 |
| 2018/0109451 A1* | 4/2018 | Wei | ....................... | H04L 69/166 |
| 2019/0215188 A1* | 7/2019 | Ethier | .................. | H04L 9/0618 |
| 2019/0215385 A1* | 7/2019 | Ethier | .................. | H04L 45/123 |
| 2020/0119941 A1* | 4/2020 | Chen | .................. | H04L 61/5014 |
| 2021/0144028 A1* | 5/2021 | Yu | ........................... | H04L 45/74 |

OTHER PUBLICATIONS

International Search Report dated May 14, 2020 for corresponding International Application No. PCT/FR2020/050169, Feb. 3, 2020.
Written Opinion of the International Searching Authority dated May 14, 2020 for corresponding International Application No. PCT/FR2020/050169, filed Feb. 3, 2020.
Intel Corporation, "Enhancements to NR DL signals and channels for unlicensed operation", vol. RAN WG1, No. Chengdu, China; Oct. 8, 2018-Oct. 12, 2018, Sep. 29, 2018 (Sep. 29, 2018), 3GPP Draft; R1-1810764, 3rd Generation Partnership Project (3GPP), Mobile Competence Centre ; 650, Route Des Lucioles ; F-06921 Sophia-Antipolis Cedex ; France, XP051518169.
Intel Corporation, "Initial design on technology neutral preamble for unlicensed operation", vol. RAN WG1, No. Gothenburg, Sweden; Aug. 20, 2018-Aug. 24, 2018, Aug. 11, 2018 (Aug. 11, 2018), 3GPP Draft; R1-1808690, 3RD Generation Partnership Project (3GPP), Mobile Competence Centre ; 650, Route Des Lucioles ; F-06921 Sophia-Antipolis Cedex ; France, XP051516065.

* cited by examiner

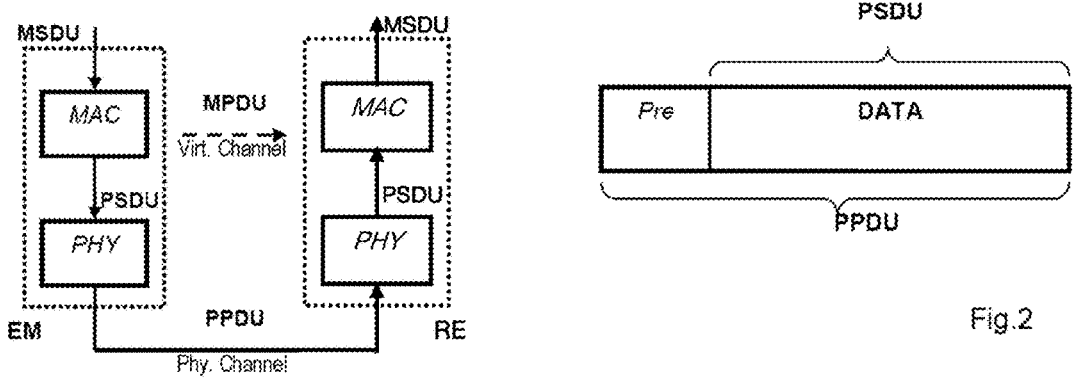
Fig.1
Fig.2
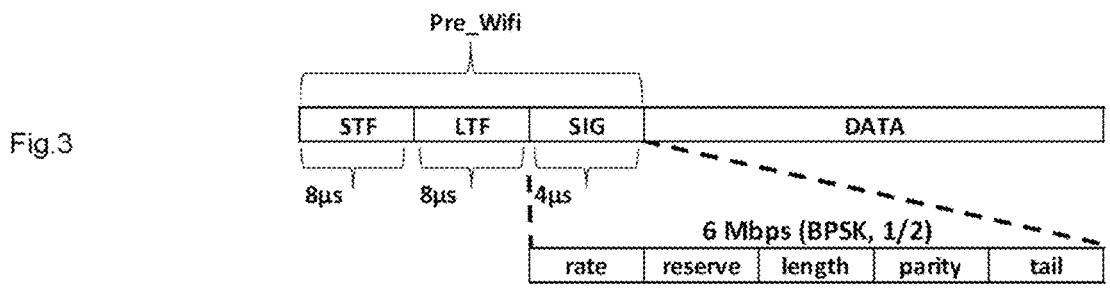
Fig.3
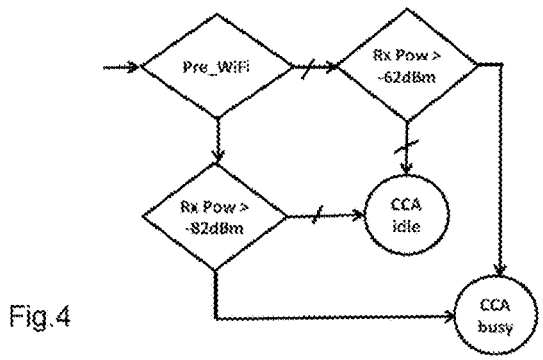
Fig.4
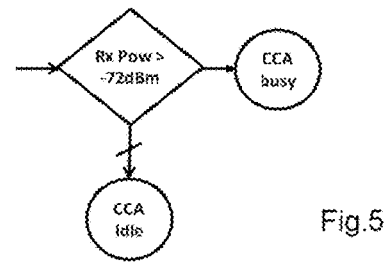
Fig.5

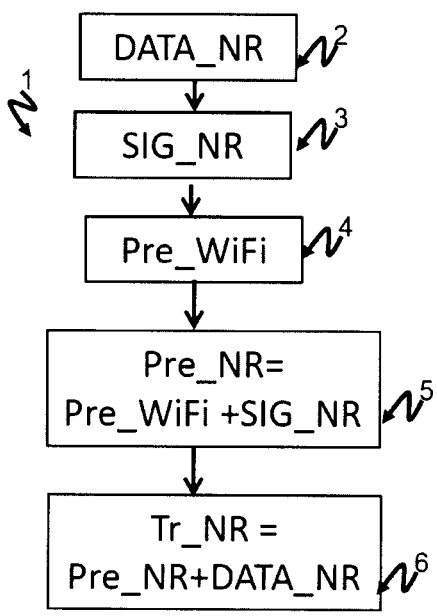
Fig.9
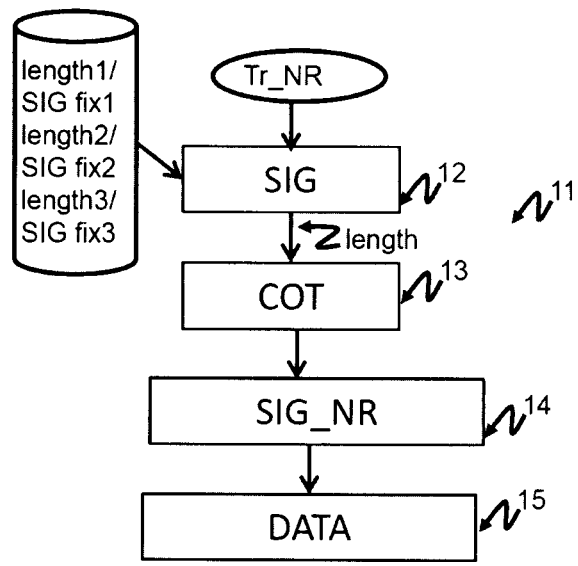
Fig.10
| length1 | SIG fix1 |
| --- | --- |
| length2 | SIG fix2 |
| length3 | SIG fix3 |
Fig.13
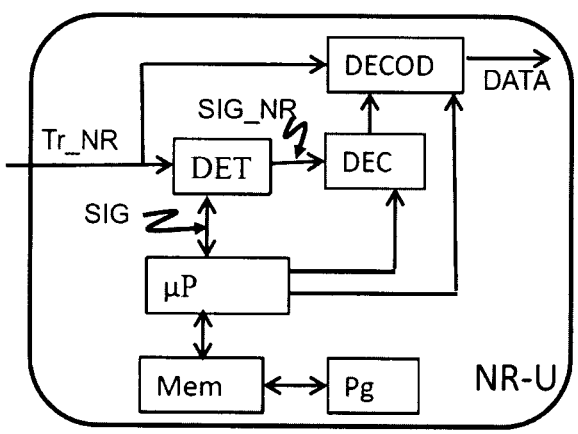
Fig.12
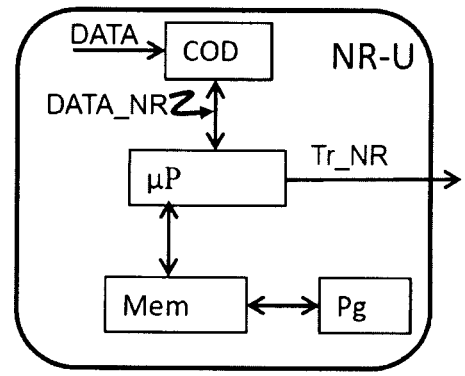
Fig.11

TWO-PROTOCOL TRANSMISSION METHOD, RECEPTION METHOD AND CORRESPONDING DEVICES AND SIGNAL

CROSS-REFERENCE TO RELATED APPLICATIONS

This Application is a Section 371 National Stage Application of International Application No. PCT/FR2020/050169, filed Feb. 3, 2020, which is incorporated by reference in its entirety and published as WO 2020/161419 A1 on Aug. 13, 2020, not in English.

FIELD OF THE INVENTION

The present invention relates to the field of telecommunications. Within this field, the invention relates more particularly to transmission and reception methods allowing coexistence, in one and the same frequency band, between equipments communicating via a cellular access network and equipments implementing wireless transmissions. It is applicable in particular to portable telecommunications devices.

PRIOR ART

The communication transmission medium is commonly called a transmission channel or propagation channel, originally with reference to an airborne channel and, by extension, with reference to any channel. Wireless systems have what is called an RF transmission interface when they involve a telecommunications system with airborne transmission of a signal belonging to a radio band (for example GSM, UMTS, IEEE 802.11x, IEEE 802.16e). Among these systems, a distinction is drawn between cellular access systems that are also said to be mobile, specified more particularly by the 3GPP, and non-mobile systems that essentially comprise those based on a Wi-Fi standard.

Telecommunications systems are generally structured with an architecture that responds to a layered organization in accordance with the OSI communication model, standardized by the ISO (International Organization for Standardization).

The OSI communication model defines the data transmission service management by way of seven superimposed protocol layers: the physical layer (layer 1), the data link layer (layer 2), the network layer (layer 3), the transport layer (layer 4), the session layer (layer 5), the presentation layer (layer 6) and the application layer (layer 7).

The first three layers 1, 2 and 3, called lower layers, relate to implementing the connection and transportation of data. The following four layers, called upper layers, are responsible for processing the data. This organization therefore allows the telecommunications system to implement the service associated with the processed data.

FIG. 1 is a basic diagram of the virtual exchange of frames between the physical PHY and MAC layers of a transmitter EM and of a receiver RE. The diagram shows one example of encapsulating SDU (Service Data Unit) data in PDUs (Protocol Data Unit) for the PHY and MAC layers, ({PSDU and PPDU} for the PHY layer, {MSDU and MPDU} for the MAC layer).

What are known as Wi-Fi systems are based on one of the IEEE 802.11 standards. The IEEE 802.11a standard is the first of these standards, which specifies a physical layer based on what is known as OFDM (Orthogonal Frequency Division Multiplex) modulation with radio transmission in the 5 GHz band. OFDM modulation uses a 64-point inverse Fourier transform called IFFT (Inverse Fast Fourier Transform) on a 20 MHz band, that is to say a spacing between sub-carriers of 312.5 kHz in order to generate symbols of a duration of 3.2 µs. The addition of a cyclic prefix of a duration of 0.8 µs results in OFDM symbols of a duration of 4 µs.

Since Wi-Fi transmissions are asynchronous with CSMA (Carrier Sense Multiple Access) access to the channel, for example, the PPDU frames that are transmitted must contain a preamble Pre, with reference to FIG. 2, so that the receiver is able to detect the arrival of the transmitted frame, is able to synchronize itself, is able to extract the signaling that contains the encoding mode and is able to decode the data.

With reference to FIG. 3, the preamble Pre_WiFi in accordance with the IEEE 802.11a standard contains three fields: STF, LTF and SIG.

The field STF (Short Training Field) of a duration of 8 µs contains ten repetitions of a symbol of a duration of 0.8 µs and is used for:
 detecting the start of a frame using the correct correlation properties of a base sequence,
 automatic gain control,
 an initial estimate of a frequency offset and
 an initial time synchronization.

The field LTF (Long Training Field) contains two training symbols of a duration of 3.2 µs preceded by a cyclic prefix of a duration of 1.6 µs and is used for:
 an estimate of the transmission channel,
 a fine estimate of the frequency offset and
 a fine time synchronization.

The field SIG (Signal field) contains twenty-four bits of information transmitted using BPSK (Binary Phase Shift Keying) modulation and binary convolution code (BCC) of rate 1/2 with:
 4 bits of information rate about the data rate (modulation and code rate) used for the data field DATA,
 a reserved bit reserve set to zero,
 12 bits of information length about the length in bytes of the data field DATA, which, coupled with the data rate information, makes it possible to determine the remaining temporal duration of the frame (i.e. the duration of the DATA field),
 a parity bit parity calculated on the previous seventeen bits and
 six end bits tail used to empty the encoder and the decoder and allow the SIG field to be decoded separately from the DATA field.

The preamble specified by the IEEE 802.11a standard has been adopted by the IEEE 802.11n standard for the mixed-mode format and by the IEEE 802.11ac and IEEE 802.11ax standards in order to ensure backward compatibility. Therefore, all of the PPDU frames transmitted by a Wi-Fi equipment in particular in the 5 GHz band have to begin with an IEEE 802.11a type preamble, with the exception of the optional format known as "greenfield" format of the IEEE802.11n standard.

Given the random access to the channel, the physical layer has to listen to the channel in order to determine its state: busy (Busy) or free (Idle), and inform the MAC layer thereof. The CS (Carrier Sense) function of the CCA (Clear Channel Assessment) mechanism is used for this purpose.

The physical layer PHY thus measures the energy level received over a window of 4 µs and compares it to a threshold. For a bandwidth of 20 MHz, the standard defines two thresholds: −82 dBm and −62 dBm. A received transmission is recognized as a valid OFDM transmission if the received energy level is greater than or equal to the threshold of −82 dBm and if the detected preamble is valid, i.e. complies with the IEEE 802.11a standard. A received transmission is recognized as a transmission of another type if the received energy level is greater than or equal to the threshold of −62 dBm. The first threshold is commonly called PD (Preamble Detect) and the second one is commonly called ED (Energy Detect).

The corresponding CCA state machine is illustrated in FIG. 4. To detect Wi-Fi transmission with an IEEE 802.11a preamble, the receiver constantly implements a correlation (in the form either of an autocorrelation or of a cross-correlation depending on the mode of implementation) on the symbols of the STF field. An IEEE 802.11a preamble has to be detected before the end of the 4 μs of a window, i.e. equal to half the STF field, for the receiver to use the first PD threshold (−82 dBm) to decide on the CCA state of the channel. Furthermore, the validity of the SIG field (determined during the decoding of this SIG field) of the preamble Pre_WiFi defines the final choice of the threshold. An invalid SIG field results in a change to the highest threshold, −62 dBm, even if this threshold had been set to −82 dBm following the detection of the STF field. And in this case, if the received energy exceeds the threshold Rx Pow>−62 dBm, the channel is considered to be busy CCA busy, and if the received energy is below the threshold, the channel is considered to be free CCA idle. A valid SIG field confirms the choice of the lowest threshold −82 dBm. In this case, if the received energy exceeds the threshold Rx Pow>−82 dBm, the channel is considered to be busy CCA busy, and if the received energy is below the threshold, the channel is considered to be free CCA idle.

The MAC layer implements the channel access mechanism based on the DCF (Distributed Coordination Function) function by taking into account the CS/CCA state provided by the physical layer. The MAC layer may furthermore use a distributed channel access mechanism, EDCA (Enhanced Distributed Channel Access), to obtain a quality of service, QoS (Quality of Service), based on a prioritization. These mechanisms are similar to the LBT (Listen Before Talk) mechanism. Thus, when a device has something to transmit, it follows the basic rule of an LBT mechanism, which is to defer its transmission for as long as the channel to which it is listening is busy and to await a random duration as soon as it has detected that the channel is free in order to avoid collisions.

As part of the work carried out within the 3GPP and that led to version 13 of the LTE standard, the LAA (License Assisted Access) access mechanism was introduced and specified in the unlicensed 5 GHz radio band common to the one used by Wi-Fi equipments. This mechanism uses the LBT mechanism and in particular what is known as a category 4 mode (cat4 scheme) based on the Wi-Fi EDCA procedure, which makes it possible to improve coexistence with other communications and more particularly with those occurring in the licensed LTE band. The corresponding CCA state machine of the LAA mechanism is illustrated in FIG. 5. This state machine is different from that of a Wi-Fi equipment illustrated in FIG. 4. Indeed, for the LAA mechanism. there is only one threshold, called ED, configured at −72 dBm. Thus, the result of the comparison of the received energy with this threshold Rx Pow>−72 dBm makes it possible to conclude as to a busy channel CCA busy or to a free channel CCA idle.

This difference between the state machines of Wi-Fi and LTE LAA may lead to unfairness in terms of access to the channel: one and the same received signal may lead to a CCA busy state for LAA technology, respectively Wi-Fi technology, whereas it appears free for Wi-Fi technology, respectively LAA technology. There are thus problems with regard to coexistence between the technologies in certain scenarios. In these scenarios, one of the technologies benefits from a higher priority than the other technology, and transmissions using this other technology will not be protected. These scenarios are illustrated in FIGS. 6 and 7.

FIG. 6 illustrates unfair access to the channel for a terminal using LAA technology in a context of current Wi-Fi transmission.

In the context of current Wi-Fi transmission, an access point AP1 is transmitting a Wi-Fi signal to a station STAB. During this Wi-Fi transmission, the −82 dBm threshold relating to the CCA state machine of a Wi-Fi equipment is represented by a circle centered on the access point AP1, which is the transmitter of this Wi-Fi transmission. The station STA A located inside the −82 dBm circle, which wishes to transmit a Wi-Fi signal to an access point AP2, detects and decodes a Wi-Fi preamble. As long as AP1 is transmitting a Wi-Fi signal, this station STA A sets the CCA threshold to −82 dBm and is not able to access the channel, since the energy level that it receives is greater than this threshold; the channel is busy (CCA busy) for it. However, an LAA device located inside the −82 dBm circle but outside a −72 dBm circle detects an energy level below the CCA threshold of −72 dBm; the channel is free for it. This LAA device may access the channel to transmit to a base station BS.

Figure 7:
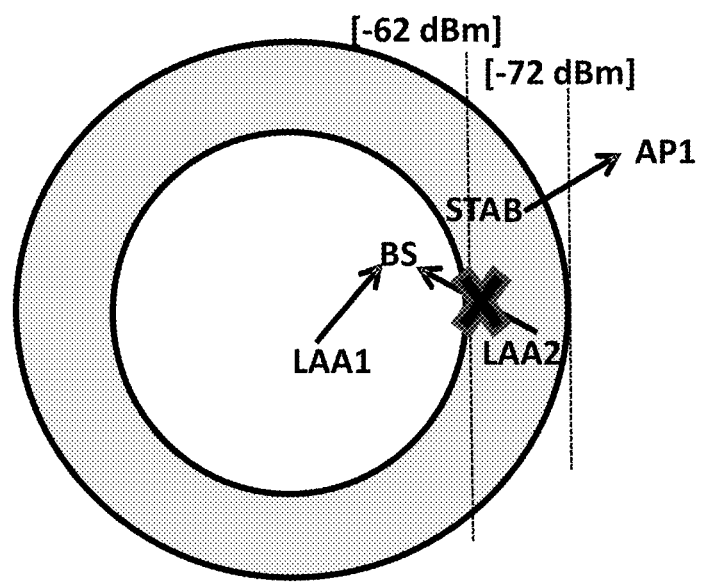

FIG. 7 illustrates unfair access to the channel for a Wi-Fi terminal in a context of current LAA transmission.

In the context of current LAA transmission, a first device LAA1 is transmitting a signal to a base station BS. A second device LAA2 located inside a −72 dBm circle centered on the first device LAA1 detects an energy greater than the CCA threshold of −72 dBm; the channel is busy for it. This second device LAA2 is therefore not able to access the channel for as long as the first device LAA1 is transmitting. On the other hand, a Wi-Fi station STA B station located inside the −72 dBm circle but outside a −62 dBm circle, both centered on the first device LAA1, does not detect a Wi-Fi preamble and sets its CCA threshold to −62 dBm. This station STA B detects an energy level below the CCA threshold of −62 dBm; the channel is free for it. This station STA B may access the channel to transmit to an access point AP1.

There is therefore a need for a technique that makes it possible to ensure fairer channel access in the case of coexistence between a Wi-Fi technology and a mobile access network, for example of LTE type, in a common band, for example the unlicensed 5 GHz band.

DISCLOSURE OF THE INVENTION

The invention proposes a method for the transmission of data by an equipment to a base station of a mobile access network conforming to a first protocol, the transmission taking place in a frequency band shared with a network conforming to a second protocol. The transmission method comprises:

encoding the data to be transmitted in accordance with the first protocol so as to obtain encoded data, determining a preamble conforming to the first protocol, called preamble field, generating a preamble conforming to the second protocol, adding the preamble field to the preamble conforming to the second protocol so as to form a new preamble, adding the new preamble to the encoded data so as to form a frame to be transmitted.

The invention furthermore relates to a mobile terminal conforming to a first protocol and able to transmit in a frequency band shared with a network conforming to a second protocol. The terminal comprises:
- an encoder for encoding data in accordance with the first protocol and obtaining encoded data,
- a processor for generating a preamble, called preamble field, conforming to the first protocol,
- a processor for generating a preamble conforming to the second protocol,
- a processor for adding a field, called preamble field, to the preamble so as to form a new preamble, this preamble field conforming to the first protocol,
- a processor for adding the new preamble to the encoded data and forming a frame to be transmitted.

The invention furthermore relates to a method for the reception of data frames by an equipment conforming to a first protocol, the reception taking place in a frequency band shared with a network conforming to a second protocol, a received frame comprising a new preamble and data encoded in accordance with the first protocol, the new preamble comprising a preamble conforming to a second protocol and a preamble field conforming to the first protocol, the preamble comprising a field of determined content. The reception method comprises:
- detecting the field of determined content through comparison with one of the fields with determined content that are stored in a table, each field with determined content being stored with data size information,
- estimating a temporal duration of the received frame corresponding to the data size information corresponding to the detected field,
- detecting and decoding the preamble field so as to determine decoding of the encoded data.

The invention furthermore relates to a mobile terminal conforming to a first protocol and able to receive frames in a frequency band shared with a network conforming to a second protocol, a received frame comprising a new preamble and data encoded in accordance with the first protocol, the new preamble comprising a preamble conforming to the second protocol and a preamble field conforming to the first protocol, the preamble comprising a field of determined content. The terminal comprises:
- a detector for detecting the field of determined content through comparison between the received frame and, in succession, one of the fields with determined content that are stored in a table, each field with determined content being stored with data size information,
- a processor for estimating a temporal duration of the received frame corresponding to the data size information corresponding to the detected field,
- a detector for detecting the preamble field,
- a decoder for decoding the preamble field so as to determine decoding of the encoded data,
- a decoder for decoding the encoded data.

The invention furthermore relates to a transmitted or received digital signal containing a frame comprising a new preamble and data encoded in accordance with a first protocol, the new preamble comprising a preamble conforming to a second protocol and a preamble field conforming to the first protocol, the preamble comprising a field of determined content.

The preamble conforming to the second protocol allows any equipment conforming to this protocol to detect this preamble. This equipment is furthermore capable of decoding this preamble, and it therefore interprets the transmission of a frame according to the invention as conforming to the second protocol, and it concludes therefrom that the channel is busy. This equipment is therefore not able to access the channel for as long as a first equipment conforming to the first protocol is transmitting data in accordance with a method according to the invention.

The preamble field conforming to the first protocol allows any equipment conforming to this protocol to detect this preamble and to obtain information contained in this field in order to decode the data in the data field.

Thus, in the case of a second protocol conforming to a Wi-Fi standard, any Wi-Fi equipment is able to detect any transmission of data encoded in accordance with the first protocol conforming to a mobile standard using the same frequency band, for example 5 GHz, if this transmission takes place in accordance with a method according to the invention. This Wi-Fi equipment therefore keeps its CCA threshold of −82 dBm, since it correctly decodes the preamble conforming to this second protocol.

And any Wi-Fi equipment considers the channel to be busy as soon as a transmission according to the invention takes place, and in particular when this transmission transmits data encoded in accordance with a protocol conforming to a mobile standard.

According to one particular embodiment of the invention, the preamble conforming to the second protocol comprises a first field, a second field and a third field of determined content, the first field making it possible to detect the preamble, perform a rough frequency synchronization and a rough time synchronization, the second field making it possible to perform a fine frequency synchronization and a fine time synchronization.

According to this embodiment, the second protocol is fully compatible with a Wi-Fi standard. This embodiment is thus particularly suitable for coexistence between Wi-Fi equipments and 5G equipments.

According to one particular embodiment of the invention, the content of the third field is determined by selecting a field with fixed content from among a plurality of fields in a table addressed by a number in relation with a temporal duration of the transmitted frame.

According to one particular embodiment of the invention, the preamble and the preamble field are generated with one and the same clock rate.

According to one particular embodiment of the invention, the preamble and the preamble field are generated with different clock rates.

According to one particular embodiment, the reception method furthermore comprises:
- upon recognition of the preamble conforming to a second protocol, setting a received energy threshold to a first value and otherwise setting the threshold to a second value greater than the first.

According to one particular embodiment, the terminal able to receive frames furthermore comprises:
- a processor for setting a received energy threshold to a first value upon recognition of the preamble conforming to a second protocol and otherwise setting the threshold to a second value greater than the first.

In the case of a second protocol conforming to a Wi-Fi standard and a first protocol conforming to a 5G standard, the first threshold value is typically −82 dBm and the second value is typically −62 dBm. Any NR equipment conforming to the first protocol that detects a frame with a Wi-Fi preamble sets its threshold to the first value of −82 dBm. Therefore, if this NR equipment is located beyond a radius of −62 dBm and within a radius of −82 dBm of a transmitting Wi-Fi equipment, the NR equipment considers the channel to be busy in the same way as a Wi-Fi equipment located in the same perimeter interval. This mode thus ensures fair access to the channel between a Wi-Fi equipment and an NR equipment.

LIST OF THE FIGURES

Figure 8:
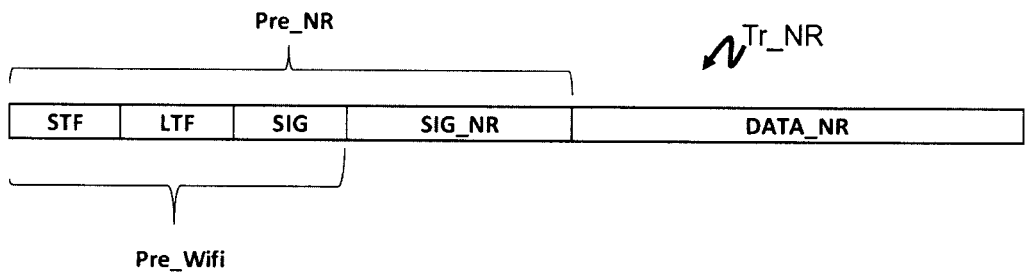
Figure 14:
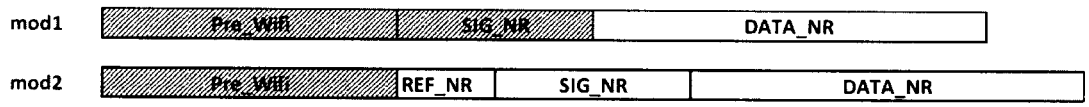
Figure 15:
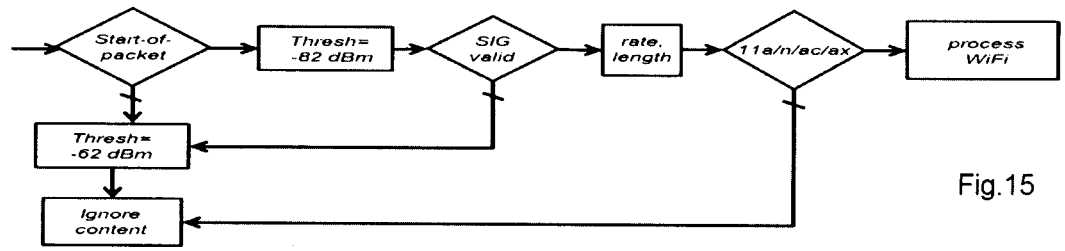
Figure 16:
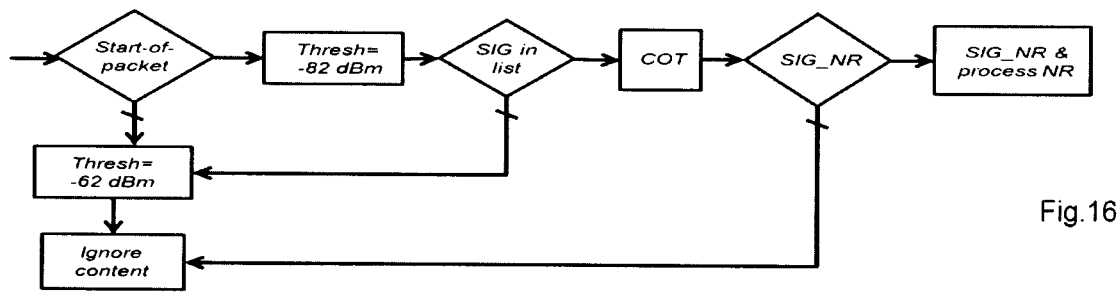
Figure 17:
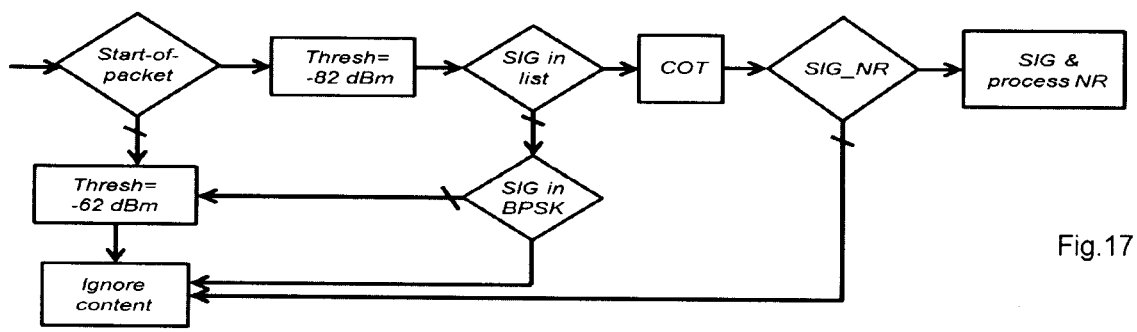

Other features and advantages of the invention will become more clearly apparent upon reading the following description of particular embodiments, provided by way of simple illustrative and nonlimiting examples, and the appended drawings, in which:

FIG. 1, already commented upon in relation to the prior art, is a basic diagram of the virtual exchange of frames between the physical layers PHY and MAC of a transmitter EM and of a receiver RE, FIG. 2 is a diagram of the general structure of a PPDU frame, FIG. 3 is a diagram detailing the structure of the preamble of an IEEE802.11a frame, FIG. 4 is a diagram of the CCA state machine of a Wi-Fi equipment, FIG. 5 is a diagram of the CCA state machine of an LAA equipment, FIG. 6 is a diagram of the thresholds involved upon accessing of the channel by a terminal using LAA or Wi-Fi technology in a context of current Wi-Fi transmission, which illustrates impossible access for the station STA A and possible access for the equipment LAA, FIG. 7 is a diagram of the thresholds involved upon accessing of the channel by a terminal using Wi-Fi or LAA technology in a context of current LAA transmission by an equipment LAA1, which illustrates impossible access for the equipment LAA2 and possible access for the station STA B, FIG. 8 is a diagram of the structure of a frame Tr_NR with details about its preamble, FIG. 9 is a flowchart of a transmission method according to the invention, FIG. 10 is a flowchart of a reception method according to the invention, FIG. 11 is a diagram of a simplified structure of an NR-U equipment according to the invention, able to implement a transmission method according to the invention, FIG. 12 is a diagram of a simplified structure of an NR-U equipment according to the invention, able to implement a reception method according to the invention, FIG. 13 is a table of records each comprising a symbol length indication and a SIG field, FIG. 14 is a diagram of the structure of a frame Tr_NR with the parts having the same inter-carrier spacing being shown in hatched form, for two different modes, FIG. 15 is a diagram of the state machine of a reception method implemented by a Wi-Fi equipment, FIG. 16 is a diagram of the state machine of a reception method implemented by an NR-U equipment according to the invention, FIG. 17 is a diagram of the state machine of one particular embodiment of a reception method implemented by an NR-U equipment according to the invention.

DESCRIPTION OF ONE EMBODIMENT OF THE INVENTION

The general principle of the invention is based on the use of a preamble conforming to a second protocol to which a preamble field conforming to a first protocol, different from the second one, is added, such as a protocol for accessing a mobile network, for example NR (New Radio or 5G) deployed in an unlicensed band common to the second protocol, for any frame transmitted with a data field conforming to this first protocol.

The structure of the corresponding frame Tr_NR according to the invention is illustrated in FIG. 8. The frame Tr_NR contains a preamble Pre_NR and a data field DATA_NR. The preamble Pre_NR contains a preamble Pre_WiFi conforming to the second protocol and a preamble field SIG_NR conforming to the first protocol.

When an equipment conforming to this first protocol transmits a frame Tr_NR formatted according to the invention, any equipment conforming to the second protocol is able to detect the preamble Pre_WiFi conforming to this second protocol. And, any equipment conforming to the first protocol and to the invention is able to detect and decode the preamble field SIG_NR, the preamble field SIG_NR being encoded before transmission in accordance with specific channel encoding of this first protocol.

Any equipment conforming to the second protocol and that receives enough energy thus detects the preamble Pre_WiFi contained in the frame Tr_NR. It then considers the channel to be busy; it is not able to access the channel.

Any equipment according to the invention and conforming to the first protocol that receives enough energy detects the preamble field SIG_NR. It is able to decode it and determine that the channel is busy.

Therefore, none of the equipments conforming to the second protocol are able to access the channel to the detriment of an equipment according to the invention and conforming to the first protocol. Coexistence is therefore improved.

The data in the data field of the frame are encoded in accordance with the first protocol. Any equipment conforming to the first protocol and that decodes the preamble field SIG_NR is able to extract therefrom the data encoding information and decode them by implementing the decoding corresponding to this encoding.

A method for the transmission of data according to the invention, implemented by an equipment to a base station of a mobile access network conforming to the first protocol, is illustrated by the flowchart in FIG. 9. The transmission takes place in a frequency band shared with a network conforming to the second protocol.

The method 1 comprises:
encoding 2 the data to be transmitted in accordance with the first protocol so as to obtain encoded data DATA_NR,
generating 3 a preamble, called preamble field SIG_NR, conforming to the first protocol,
generating 4 a preamble Pre_WiFi conforming to the second protocol,
adding 5 the preamble field SIG_NR to the preamble Pre_WiFi conforming to the second protocol so as to form a new preamble Pre_NR,
adding 6 the new preamble Pre_NR to the encoded data DATA_NR so as to form a frame Tr_NR to be transmitted.

The preamble field SIG_NR allows a receiver conforming to the first protocol to detect this preamble field. The preamble field furthermore makes it possible to transmit information specific to an equipment conforming to the first protocol and which may be necessary in particular to decode the transmitted data.

The preamble Pre_WiFi conforming to the second protocol allows a receiver conforming to the second protocol to detect this preamble Pre_WiFi and to determine that the channel is busy. According to one particular embodiment, the preamble Pre_WiFi comprises information about the length of the fields that follow this preamble. This information thus allows an equipment conforming to the second protocol and that detects and decodes the preamble Pre_WiFi to evaluate a channel occupation time given by this information. It therefore considers that the channel is busy during this period, thereby ensuring that it does not interfere with the transmission of all of the data in the frame that are intended for an equipment according to the first protocol.

A method for the reception of data frames, implemented by an equipment conforming to a first protocol, is illustrated by the flowchart in FIG. 10. The reception takes place in a frequency band shared with a network conforming to a second protocol. The received frame Tr_NR contains a new preamble Pre_NR and data DATA_NR encoded in accordance with the first protocol. The new preamble Pre_NR contains a preamble Pre_WiFi conforming to a second protocol and a preamble field SIG_NR conforming to the first protocol. The preamble Pre_WiFi contains a field SIG of determined content.

The reception method 11 comprises:
  detecting 12 the field SIG of determined content through comparison with fields SIG fix1, SIG fix2, SIG fix3 with determined content that are stored in a table, each field with determined content being stored with data size information length1, length2, length3,
  estimating 13 a temporal duration COT of the received frame Tr_NR corresponding to the data size information length corresponding to the detected field SIG,
  detecting 14 and decoding 14 the preamble field SIG_NR so as to determine decoding 15 of the encoded data and obtain the decoded data DATA.

According to one embodiment, the comparison is performed through correlation between the received SIG field and a field with determined values that is stored in the table.

The simplified structure of an equipment according to the invention conforming to a first protocol and able to implement a transmission method according to the invention is illustrated in FIG. 11.

The NR-U equipment comprises a processor µP whose operation is controlled by the execution of a program Pg whose instructions make it possible to implement a transmission method according to the invention, an encoder COD, and a memory Mem comprising a buffer memory.

On initialization, the code instructions of the program Pg are for example loaded into the buffer memory Mem before being executed by the processor µP.

The encoder COD receives the data DATA to be transmitted at input. It encodes said data in accordance with the first protocol so as to obtain encoded data DATA_NR to be transmitted.

The processor µP determines a preamble SIG_NR to the data to be transmitted, conforming to the first protocol, called preamble field.

The processor µP generates a preamble Pre_WiFi conforming to the second protocol so as to allow a receiver conforming to the second protocol to detect this preamble Pre_WiFi and to determine that the channel is busy.

The processor µP adds the preamble field SIG_NR to the preamble Pre_WiFi so as to form a new preamble Pre_NR.

The processor µP adds the new preamble Pre_NR to the encoded data DATA_NR supplied by the encoder COD so as to form a frame Tr_NR to be transmitted.

The simplified structure of an equipment according to the invention conforming to a first protocol and able to implement a reception method according to the invention is illustrated in FIG. 12. The NR-U equipment comprises a detector DET for detecting the field SIG and the preamble field SIG_NR, a processor µP whose operation is controlled by the execution of a program Pg whose instructions make it possible to implement a reception method according to the invention, a decoder DECOD for decoding the encoded data DATA_NR, a decoder DEC for decoding the preamble field SIG_NR and a memory Mem comprising a buffer memory.

On initialization, the code instructions of the program Pg are for example loaded into the buffer memory Mem before being executed by the processor µP.

The detector DET receives the frame Tr_NR received by the NR-U equipment at input. The detector DET detects the field SIG of determined content through correlation between the received frame Tr_NR and, in succession, one of the fields SIG fix1, SIG fix2, SIG fix3 with determined values that are stored in a table. When there is a correlation, this occurs with one of the fields SIG fix1, SIG fix2, SIG fix3 in the table stored in the NR-U equipment, and this field is the detected SIG field. Each field with determined values is stored with data size information length1, length2, length3 in a record in the table. The detected SIG field makes it possible to identify the size information length, which is the information contained in the same record as that of the detected SIG field.

The processor µP estimates a temporal duration COT of the received frame Tr_NR corresponding to the data size information length corresponding to the detected SIG field.

The detector DET detects the preamble field SIG_NR contained in the received frame Tr_NR.

The decoder DEC decodes the preamble field SIG_NR so as to determine which decoding to apply to the encoded data contained in the received frame. Determining the decoding makes it possible to configure a decoder DECOD and obtain the decoded data DATA.

As a result, the invention also applies to one or more computer programs, in particular a computer program on or in an information medium, suitable for implementing the invention. This program may use any programming language and be in the form of source code, object code or intermediate code between source code and object code, such as in a partially compiled form, or in any other desirable form for implementing a method according to the invention.

The information medium may be any entity or device capable of storing the program. For example, the medium may include a storage means, such as a ROM, for example a CD-ROM or a microelectronic circuit ROM, or else a magnetic recording means, for example a floppy disk or a hard disk.

Moreover, the information medium may be a transmissible medium such as an electrical or optical signal, which may be routed via an electrical or optical cable, by radio or by other means. The program according to the invention may in particular be downloaded from an Internet network.

As an alternative, the information medium may be an integrated circuit in which the program is incorporated, the circuit being designed to execute or to be used in the execution of the method in question.

Exemplary Implementations

According to one embodiment, the first protocol conforms to the specifications of an NR (5G) radio access network as defined by the 3GPP, and the second protocol conforms to a Wi-Fi standard.

An NR-U equipment according to the invention is compatible with an NR (5G) radio access network and is able to operate in an unlicensed band common to Wi-Fi. This NR-U equipment is able to implement a transmission method according to the invention and to implement a reception method according to the invention.

The transmission method according to the invention is such that the generated frame Tr_NR is formatted according to the invention. The preamble Pre_NR of the frame according to the invention contains a preamble Pre_WiFi conforming to Wi-Fi and a preamble field SIG_NR conforming to the specifications of an NR (5G) radio access network. The data field DATA_NR conforms to the specifications of an NR (5G) radio access network.

The preamble Pre_WiFi of the frame Tr_NR conforms to an IEEE 802.11a preamble: it contains a first field STF, a second field LTF and a third field SIG.

The first field STF makes it possible to detect the preamble, to perform a rough frequency synchronization and to perform a rough time synchronization.

The second field LTF makes it possible to perform a fine frequency synchronization and a fine time synchronization.

The third field SIG has fixed content selected from a stored table and initially determined (offline) so as to promote simplicity.

One example of such a table is illustrated in FIG. 13. The table contains a small number of records, for example three, so as to limit the space taken up and to promote simplicity. Choosing three records makes it possible to approximate a maximum length, an average length and a minimum length of a Wi-Fi frame: for example 5 ms corresponding to 1250 OFDM symbols (the duration of one OFDM symbol being 4 µs), 3 ms corresponding at 750 OFDM symbols and 1 ms corresponding to 250 OFDM symbols.

According to one embodiment, each record contains two fields, a first field length1, length2, length3 whose content corresponds to a rough temporal length of the fields in the frame that follow the SIG field and a second field SIG fix1, SIG fix2, SIG fix3 containing the content of the SIG field corresponding to this rough length. The fixed content of the SIG field of a record is determined so as to match the length identified by the first field of the same record.

The fixed content of the SIG field of a record is generated in particular with the following constraints conforming to that of an IEEE 802.11a preamble: the data rate value rate is set to a minimum value, (1101) i.e. 6 Mbps, the reserve bit reserve is set to 0, the length length is that which corresponds to the first field of the record, the parity bit parity is determined on the basis of the previous length and the tail bits tail are all set to 0. The second field of each record therefore has a format conforming to that of the SIG field of an IEEE 802.11a preamble, and is therefore compatible with Wi-Fi transmission.

Given that the SIG field is obtained only via a selection from a stored determined table, an NR-U equipment advantageously does not need to implement specific BCC channel encoding of the Wi-Fi in order to add a preamble Pre_WiFi and construct a frame Tr_NR according to the invention.

The content of the SIG field is selected from the table by looking for the length contained in the first field of the various records that gives a greater temporal duration closest to the channel occupation time (COT), which corresponds approximately to the duration of the preamble SIG_NR and data DATA_NR fields (indeed, it is necessary to add a duration for signaling signals to the duration of the frame in order to obtain the COT). This ensures that a Wi-Fi equipment does not interfere at all during transmission according to the invention in the same way as if Wi-Fi transmission were to be involved, since this equipment considers that the channel is busy during the temporal duration associated with the SIG field and that this duration is at least greater than or equal to the actual transmission duration of the frame Tr_NR.

The preamble field SIG_NR makes it possible to transmit information specific to an NR-U equipment. This field is encoded using channel encoding specific to the NR (5G) radio access network. This channel encoding is highly different from the encoding used for fields that follow a conventional IEEE 802.11a preamble, and the probability of a false alarm is therefore almost zero. Indeed, for an IEEE 802.11a standard, the data are encoded by a BCC encoder, and for the IEEE 802.11n, IEEE 802.11ac and IEEE 802.11ax standards, the fields following the SIG field are also encoded by a BCC encoder.

The channel occupation time (COT), which corresponds approximately to the duration associated with the SIG field, is therefore a rough value intended to protect the transmission of data from coexistence in the same band of Wi-Fi equipments.

The inter-carrier spacing for this preamble field SIG_NR may correspond either to that used for Wi-Fi (i.e. 312.5 kHz) or to that specific to the NR-U access network (i.e. $15 \times 2^u$ kHz, where u=0, 1, 2, 3, 4). The NR-U equipment therefore has two clocks, a first corresponding to the inter-carrier spacing of the NR-U access network (i.e. $1/15 \times 2^u$ kHz, where u=0, 1, 2, 3, 4) and a second corresponding to the Wi-Fi inter-carrier spacing (i.e. 1/312.5 kHz).

FIG. 14 illustrates the structure of a frame Tr_NR according to two different modes. For each mode, mod1, mod2, the hatched parts have the same inter-carrier spacing, which is that used for Wi-Fi (i.e. 312.5 kHz).

In mode 1, the preamble field SIG_NR has the same inter-carrier spacing as the one used for Wi-Fi (i.e. 312.5 kHz). This mode requires the NR-U equipment to be able to perform any encoding specified for the NR-U access network while at the same time using a clock rate given by the Wi-Fi inter-carrier spacing (i.e. 1/312.5 kHz). To this end, the NR-U equipment comprises a computer/processor whose power is dimensioned to perform the encoding operations specified for the NR-U access network at the Wi-Fi clock rate.

In mode 2, the preamble field SIG_NR does not have the same inter-carrier spacing as the one used for Wi-Fi; it has the inter-carrier spacing of that of the NR-U access network (i.e. $15 \times 2^u$ kHz, where u=0, 1, 2, 3, 4). To allow switching of the clock rate following the preamble Pre_WiFi and before the preamble field SIG_NR, the frame Tr_NR contains a reference signal field REF_NR. The presence of this field allows the NR-U equipment according to the invention to anticipate its clock change before the arrival of the preamble field SIG_NR. This field REF_NR also allows the NR-U equipment according to the invention to perform synchronization before being able to decode the preamble field SIG_NR. This field REF_NR may therefore have a composition comparable to the STF and LTF fields of a Wi-Fi preamble, in the knowledge that the NR-U equipment has already obtained an estimate of the transmission channel from the LTF field of the preamble Pre_WiFi. According to one alternative, its composition may be comparable to that of an NR PSS or NR SSS field of the first NR specifications of the 3GPP 5G standard. According to the NR specifications, a PSS field is generated in one of the three possible M sequences and then modulated using a BPSK modulation. An SSS field is generated in accordance with one of the 336 possible M sequences and then modulated using a BPSK modulation. These PSS and SSS fields are used not only for time synchronization and frequency synchronization, but also to identify the identifier of the cell. To reduce complexity, a single M sequence out of the three may be used for a field equivalent to the PSS field for a time synchronization, the frequency synchronization being able to be obtained with the preamble Pre_WiFi.

The simplified structure of an NR-U equipment according to the invention conforming to an NR protocol and able to implement a transmission method according to the invention described above is illustrated in FIG. 11. The encoder COD receives the data DATA to be transmitted at input. It encodes said data in accordance with the NR protocol so as to obtain encoded data DATA_NR to be transmitted.

The processor μP determines a preamble SIG_NR to the data to be transmitted, conforming to the NR protocol, called preamble field.

The processor μP generates a preamble Pre_WiFi conforming to the Wi-Fi protocol so as to allow a receiver conforming to the Wi-Fi protocol to detect this preamble Pre_WiFi and to determine that the channel is busy.

The processor μP adds the preamble field SIG_NR to the preamble Pre_WiFi so as to form a new preamble Pre_NR.

The processor μP adds the new preamble Pre_NR to the encoded data DATA_NR supplied by the encoder COD so as to form a frame Tr_NR to be transmitted.

The state machine of a Wi-Fi equipment receiving a frame transmitted according to the invention is illustrated in FIG. 15. Any Wi-Fi equipment that receives Start-of-packet a frame generated according to the invention is able to recognize the preamble Pre_WiFi, select its CCA threshold at −82 dBm Thresh=−82 dBm and confirm this selection if SIG valid decoding the SIG field of the preamble Pre_WiFi leads to an error-free decoder output. The Wi-Fi equipment extracts the data rate rate and the length length of the fields that follow the SIG field from the correctly decoded SIG field. This length gives the approximate duration of the channel occupation time (COT) by the transmission of the frame. The Wi-Fi equipment therefore keeps its threshold of −82 dBm for this duration.

If the data rate value rate is compatible with the WiFi 11a standard, the Wi-Fi equipment may attempt to decode process WiFi the data in the data field in accordance with the procedures specific to each amendment 11a, 11n, 11ac or 11ax 11a/n/ac/ax. The Wi-Fi equipment expects to receive BCC encoded data after the preamble Pre_WiFi (i.e. just after the SIG) in accordance with the 11a/n/ac/ax procedures. However, the preamble field SIG_NR that follows the preamble Pre_WiFi is encoded with another type of coding (polar code or ldpc). There is thus no possible confusion between the frame Tr_NR and any frame Tr_WiFi; the probability of a false positive (i.e. taking a frame Tr_NR for a frame Tr_WiFi, or vice versa) is virtually zero. However, this does not call into question the threshold set to −82 dBm, and the transmission of the frame Tr_NR is therefore well protected. The length length gives it an indication of the temporal duration of the data field, thereby allowing it to stop its decoding when the duration has elapsed. If the date rate value rate is not compatible with one of the Wi-Fi standards, the equipment is not able to decode the data in the data field. It then ignores Ignore content the content of the received frame.

If SIG valid the decoding of the SIG field of the preamble Pre_WiFi leads to a decoder output with an error, then the Wi-Fi equipment conventionally sets its threshold to −62 dBm Thresh=−62 dBm. The Wi-Fi equipment then ignores Ignore content the content of the received frame.

The deployment of an NR radio access network in an unlicensed band common to a Wi-Fi standard is therefore transparent for Wi-Fi equipments if an equipment transmits via an NR radio access network in accordance with a method according to the invention, i.e. by transmitting a frame formatted according to the invention. Indeed, given the format of the frame Tr_NR transmitted by the NR-U equipment according to the invention, the Wi-Fi equipment recognizes the preamble, keeps its threshold at −82 dBm, recognizes a valid SIG field, recognizes a valid data rate rate, and it then attempts to decode the data.

An NR-U equipment according to the invention is compatible with an NR (5G) radio access network and is able to operate in an unlicensed band common to Wi-Fi. The simplified structure of such an NR-U equipment able to implement a reception method according to the invention described above is illustrated in FIG. 12. The state machine corresponding to the reception of a frame according to the invention by an NR-U equipment is illustrated in FIG. 16. The NR-U equipment according to the invention implements two thresholds at −82 dBm and −62 dBm and no longer a single threshold at −72 dBm.

Any NR-U equipment according to the invention that receives Start-of-packet a frame generated according to the invention is able to recognize the preamble Pre_WiFi and set its CCA threshold to −82 dBm Thresh=−82 dBm. Upon receiving a frame formatted according to the invention, the NR-U equipment advantageously does not need to implement BCC channel decoding. It is sufficient for the NR-U equipment to perform a correlation SIG in list in order to detect the presence of the SIG field. This correlation is calculated between the received SIG field and the second fields of the records in the table stored by the equipment so as to determine whether there is actually a strong correlation, i.e. whether the received SIG field corresponds to one of the second fields in the table. In this case, the NR-U equipment knows the rough temporal duration COT of the fields, including the DATA field, which follow the SIG field, since this duration is given by the first field of the record. This length gives the approximate duration of the temporal occupation of the channel by the transmission of the frame. The small number of records in the table makes it possible to greatly limit the additional complexity caused by looking for a correlation between the SIG field and the records in the table.

The NR-U equipment detects the preamble field SIG_NR. If this detection is successful, the equipment is able to decode it and decode SIG_NR & process NR the data in the data field DATA_NR.

If the correlation does not make it possible to recognize a SIG field from the list SIG in list, then the NR-U equipment sets its threshold to −62 dBm Thresh=−62 dBm and ignores Ignore content the content of the received frame.

One particular embodiment of the reception method detailed above with reference to FIG. 16 is illustrated in FIG. 17. According to this embodiment, the NR-U equipment according to the invention also performs a verification SIG in BPSK in order to reduce the probability of a false alarm linked to lack of detection of the SIG field. There is a false alarm if the SIG field is present in the frame transmitted according to the invention and if the correlation performed by the NR-U equipment does not make it possible to determine a correlated record.

According to this embodiment, if the NR-U equipment does not find a correlated record in the table during the test SIG in list, then it tests SIG in BPSK whether the signal corresponding to the SIG field that is transmitted may correspond to a SIG field of a Wi-Fi preamble. To carry out this test, the NR-U equipment performs a time-frequency transformation such as an N-point FFT on this received signal and obtains a complex frequency signal with N subcarriers. It compares the average power of the real part of this complex signal with that of the imaginary part for all of the N subcarriers. Indeed, BPSK modulation modulates by +1/−1, and therefore, even if an imaginary part has been introduced through noise, then the average makes it possible to differentiate this modulation from other types of modulation such as QPSK, xQAM, etc. Thus, if the average power of the real part minus that of the imaginary part is greater than a determined threshold, the receiver of the NR-U equipment considers that symbols modulated using BPSK modulation are received and have therefore been transmitted. If so, the NR-U equipment ignores Ignore content the received content. If not, the NR-U equipment sets its threshold to −62 dBm Thresh=−62 dBm, i.e. it has received energy but this does not correspond to Wi-Fi transmission, and the NR-U equipment ignores Ignore content the received content.

The invention claimed is:

1. A method for transmission of data by an equipment to a base station of a mobile access network conforming to a first protocol, the transmission taking place in a frequency band shared with a network conforming to a second protocol, comprising:
   encoding the data to be transmitted in accordance with the first protocol so as to obtain encoded data;
   determining a preamble conforming to the first protocol, called a preamble field;
   generating a preamble conforming to the second protocol, wherein the preamble conforming to the second protocol comprises a first field, a second field and a third field of determined content, the first field making it possible to detect the preamble, perform a rough frequency synchronization and a rough time synchronization, the second field making it possible to perform a fine frequency synchronization and a fine time synchronization;
   adding the preamble field to the preamble conforming to the second protocol so as to form a new preamble; and
   adding the new preamble to the encoded data so as to form a frame to be transmitted.

2. The method for the transmission of data as claimed in claim 1, wherein the content of the third field is determined by selecting a field with fixed content from among a plurality of fields in a table addressed by a number in relation with a temporal duration of the transmitted frame.

3. The method for the transmission of data as claimed in claim 1, wherein the preamble and the preamble field are generated with one and the same clock rate.

4. The method for the transmission of data as claimed in claim 1, wherein the preamble and the preamble field are generated with different clock rates.

5. A method for reception of data frames by an equipment conforming to a first protocol, the reception taking place in a frequency band shared with a network conforming to a second protocol, the method comprising:
   receiving a received frame comprising a new preamble and data encoded in accordance with the first protocol, the new preamble comprising a preamble conforming to a second protocol and a preamble field conforming to the first protocol, the preamble comprising a field of determined content;
   detecting the field of determined content through comparison with one of at least one field with determined content that are stored in a table, each field with determined content being stored with data size information;
   estimating a temporal duration of the received frame corresponding to the data size information corresponding to the detected field; and
   detecting and decoding the preamble field so as to determine decoding of the encoded data.

6. The method for the reception of data frames as claimed in claim 5, furthermore comprising:
   upon recognition of the preamble conforming to a second protocol, setting a received energy threshold to a first value and otherwise setting the threshold to a second value greater than the first.

7. A mobile terminal conforming to a first protocol and able to transmit in a frequency band shared with a network conforming to a second protocol, the terminal comprising:
   an encoder configured to encode data in accordance with the first protocol to obtain encoded data; and
   at least one processor configured to:
      generate a preamble, called a preamble field, conforming to the first protocol;
      generate a preamble conforming to the second protocol, wherein the preamble conforming to the second protocol comprises a first field, a second field and a third field of determined content, the first field making it possible to detect the preamble, perform a rough frequency synchronization and a rough time synchronization, the second field making it possible to perform a fine frequency synchronization and a fine time synchronization;
      add the preamble field, to the preamble conforming to the second protocol so as to form a new preamble; and
      add the new preamble to the encoded data and forming a frame to be transmitted.

8. A mobile terminal conforming to a first protocol and able to receive a frame in a frequency band shared with a network conforming to a second protocol, a received frame comprising a new preamble and data encoded in accordance with the first protocol, the new preamble comprising a preamble conforming to the second protocol and a preamble field conforming to the first protocol, the preamble comprising a field of determined content, the terminal comprising:
   a detector configured to detect the field of determined content through comparison between the received frame and, in succession, at least one field with determined content that is stored in a table, each field with determined content being stored with data size information;
   a processor configured to:
      estimate a temporal duration of the received frame corresponding to the data size information corresponding to the detected field;
   a detector configured to detect the preamble field; and
   a decoder configured to decode the preamble field so as to determine decoding of the encoded data and to decode the encoded data.

9. A method for transmission of data by an equipment to a base station of a mobile access network conforming to a first protocol, the transmission taking place in a frequency band shared with a network conforming to a second protocol, comprising:

encoding the data to be transmitted in accordance with the first protocol so as to obtain encoded data;

determining a preamble conforming to the first protocol, called a preamble field;

generating a preamble conforming to the second protocol and comprising a field of content that is determined by selecting a field with fixed content from among a plurality of fields in a table addressed by a number in relation with a temporal duration of a frame to be transmitted;

adding the preamble field to the preamble conforming to the second protocol so as to form a new preamble; and adding the new preamble to the encoded data so as to form the frame to be transmitted.

10. A mobile terminal conforming to a first protocol and able to transmit in a frequency band shared with a network conforming to a second protocol, the terminal comprising:

an encoder configured to encode data in accordance with the first protocol to obtain encoded data; and at least one processor configured to:
- generate a preamble, called a preamble field, conforming to the first protocol;
- generate a preamble conforming to the second protocol and comprising a field of content that is determined by selecting a field with fixed content from among a plurality of fields in a table addressed by a number in relation with a temporal duration of a frame to be transmitted;
- add the preamble field to the preamble conforming to the second protocol so as to form a new preamble; and
- add the new preamble to the encoded data and forming the frame to be transmitted.

* * * * *